June 8, 1926.
J. W. BARNES
SNUBBER
Filed Dec. 11, 1924
1,588,294
2 Sheets-Sheet 1
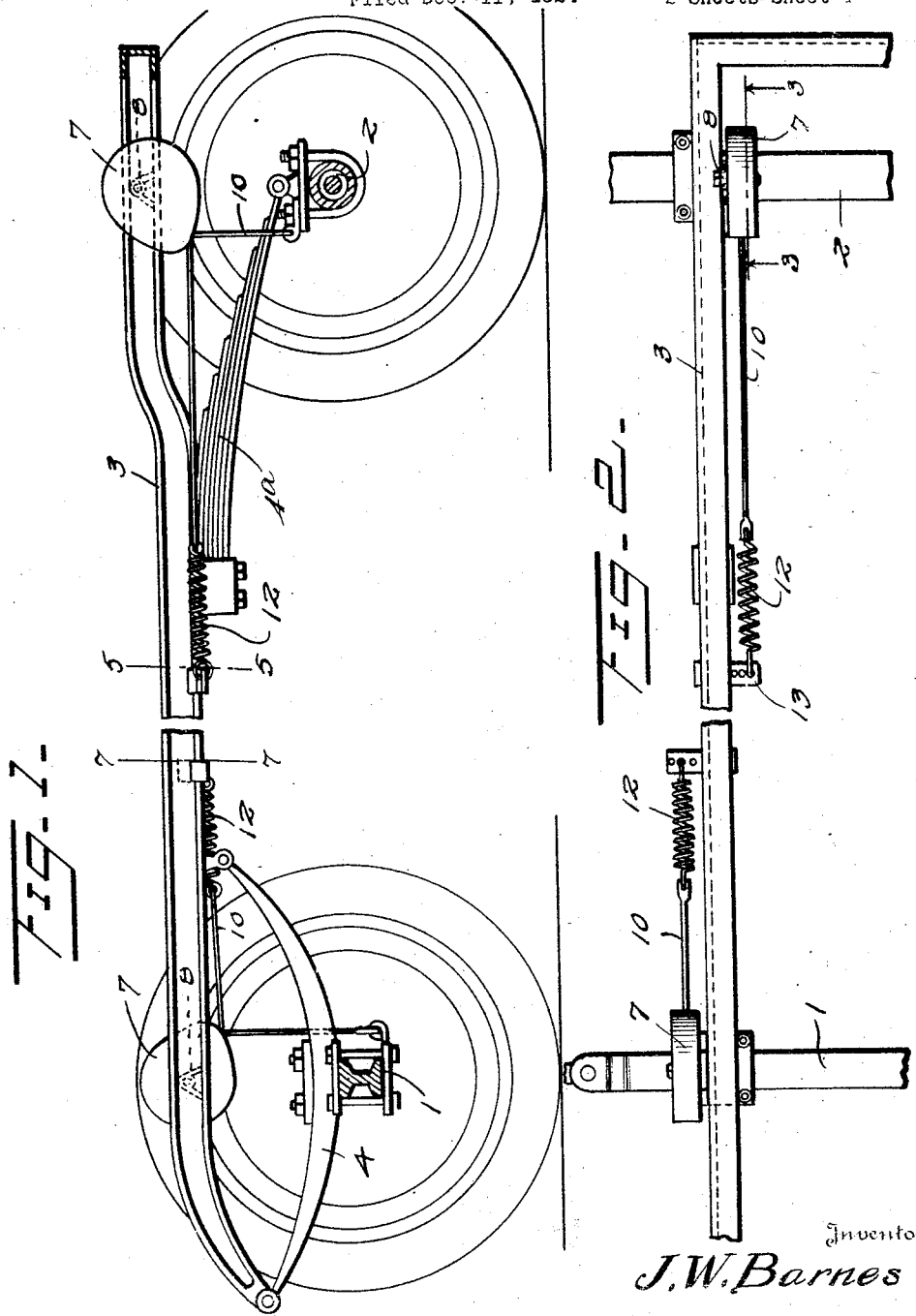
Inventor
J.W. Barnes June 8, 1926. 1,588,294
J. W. BARNES
SNUBBER
Filed Dec. 11, 1924   2 Sheets-Sheet 2
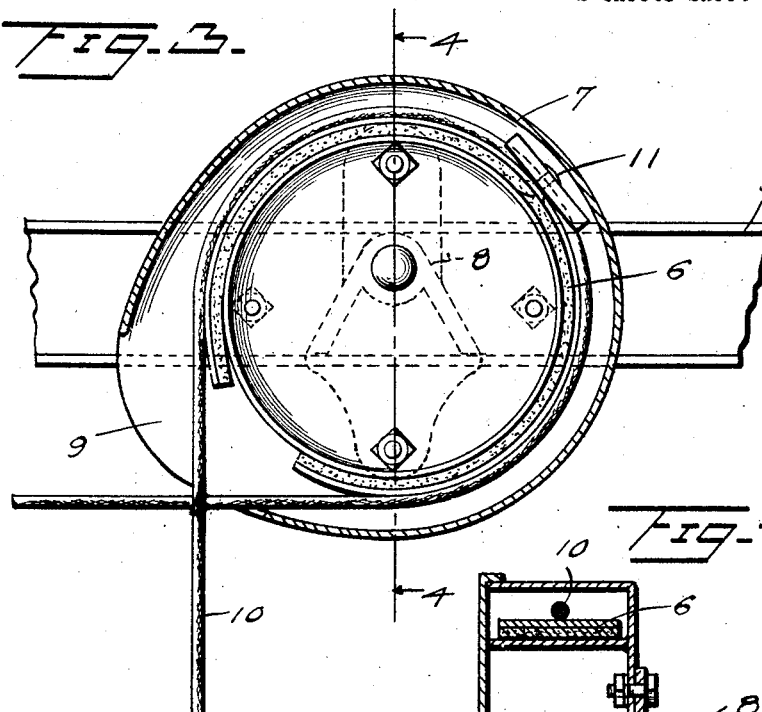
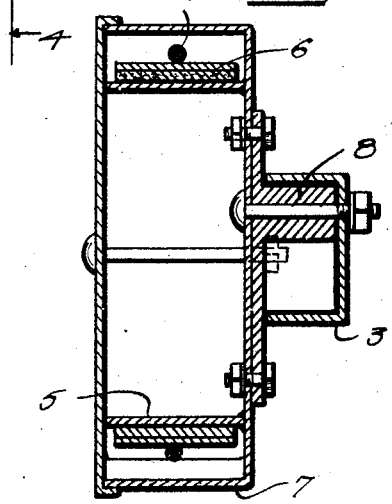
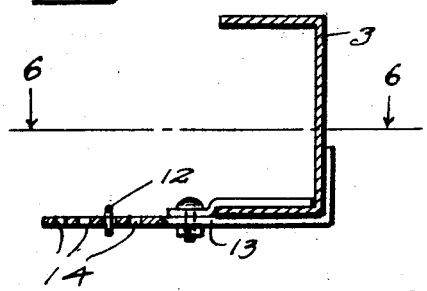
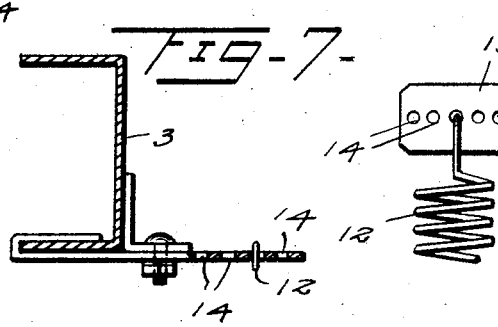
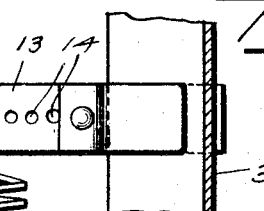
Inventor
J. W. Barnes.
By
Attorney Patented June 8, 1926.

1,588,294

UNITED STATES PATENT OFFICE.

JAMES W. BARNES, OF CLEVELAND, TENNESSEE.

SNUBBER.

Application filed December 11, 1924. Serial No. 755,238.

The present invention relates to devices for controlling and preventing the rapid rebound of a vehicle body when subjected to a violent movement incident to the wheels passing over an object or dropping into a rut and in accordance with the invention, a brake mechanism is interposed between the axle and the frame or analogous parts, said brake mechanism operating only to prevent the rapid return of the vehicle body to normal position, when depressed by shock or vibration.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a vertical longitudinal sectional view of the running gear of a motor vehicle, equipped with a snubber mechanism embodying the invention, Figure 2 is a top plan view of the part illustrated in Figure 1, Figure 3 is an enlarged sectional view on the line 3—3 of Figure 2, Figure 4 is a detail sectional view on the line 4—4 of Figure 3, Figure 5 is a sectional view on the line 5—5 of Figure 1, Figure 6 is a sectional view on the line 6—6 of Figure 5, and Figure 7 is an enlarged sectional view on the line 7—7 of Figure 1.

Corresponding and like parts are referred to in the following description and designated in the several views of the drawings by like reference characters.

The numerals 1 and 2 denote the front and rear axles respectively of a motor vehicle, and 3 a side bar of the running gear frame, or chassis, the same being connected with the axles by means of springs 4 and 4ª.

A snubber mechanism is interposed between each of the axles and the side bars of the frame and comprises a brake drum 5 and a cooperating brake member 6 consisting of an outer steel band and a lining, said brake member normally releasing the brake drum and gripping the latter only upon the rebound of the vehicle body to retard its movement and prevent a violent rebound. A housing 7 encloses the brake drum and cooperating brake band and is adapted to be secured to the frame of the vehicle in any preferred way and as shown a bracket 8 bolted to the housing is likewise bolted to a bar 3 of the frame as indicated most clearly in Figure 4. The outer wall of the housing 7 is cut away as indicated at 9 to provide an opening for the passage of end portions of a cable 10 which is attached to the brake band 6 at a central point as indicated at 11, the end portions of the cable crossing and extending at a right angle to each other, one of the ends being connected to the axle and the other end being yieldably connected to the frame as indicated at 12, the yieldable connection consisting of a coil spring which is adapted to be adjustably connected to the frame as indicated at 13 which consists of a clamp having a projecting portion provided with a plurality of openings 14, one of which is adapted to receive the end of the spring 12.

In practice, each end of each of the axles has a snubber in conjunctive relation therewith, the brake mechanism being mounted upon the frame of the chassis, and the brake band 6 being connected to the axle and the said frame by means of the cable 10 in the manner stated herein. The spring 12 is normally under tension and when the frame descends the slack in the cable 10 is taken up by means of the spring 12 and upon the rebound of the frame or body the spring 12 operates to cause the brake band to grip the brake drum thereby retarding the rebound and causing the device to operate as a snubber.

What is claimed is:—

A snubber comprising a housing, a drum extending laterally from said housing, said housing being open at one side, a closure for said side, said drum extending completely across the housing, a bracket secured to and rigidifying the closed wall of the housing, said bracket having an extension adapted for disposition in a channel beam in combination with securing means engaging the beam, the circumferential wall of the housing being open at a portion thereof and snubbing means engaging said drum passing through the opening of said lateral portion for connection to vehicle parts.

In testimony whereof I affix my signature.

JAMES W. BARNES.